United States Patent [19]
Mesenich

[11] Patent Number: 5,033,716
[45] Date of Patent: Jul. 23, 1991

[54] ELECTROMAGNETIC FUEL INJECTOR

[75] Inventor: Gerhard Mesenich, Bochum, Fed. Rep. of Germany

[73] Assignee: Siemens Automotive L.P., Troy, Mich.

[21] Appl. No.: 419,376

[22] Filed: Oct. 10, 1989

[30] Foreign Application Priority Data

Oct. 10, 1988 [DE] Fed. Rep. of Germany ....... 3834447

[51] Int. Cl.[5] ........................ F16K 31/06; F02M 51/00
[52] U.S. Cl. ............................... 251/129.21; 239/585; 29/890.12
[58] Field of Search ...................... 251/129.21, 129.16; 239/585; 29/157.1 R

[56] References Cited

U.S. PATENT DOCUMENTS

| | | | |
|---|---|---|---|
| 3,001,757 | 9/1961 | Ball | 251/129.16 |
| 4,477,027 | 10/1984 | Knapp et al. | 251/129.21 X |
| 4,655,249 | 4/1987 | Livet | 251/129.21 X |
| 4,705,210 | 11/1987 | Graser et al. | 251/129.21 X |
| 4,832,314 | 5/1989 | Trott | 251/129.16 |

*Primary Examiner*—Arnold Rosenthal
*Attorney, Agent, or Firm*—Russel C. Wells; George L. Boller

[57] ABSTRACT

An electromagnetic fuel injector is equipped with a flat valve seat. The injector features a parallel hydraulic guidance system for the armature which is obtained by suitably disposed hydraulic damping gaps. In addition, a method of manufacturing said hydraulic damping gaps is described.

3 Claims, 3 Drawing Sheets

ELECTROMAGNETIC FUEL INJECTOR

The subject of the invention is an electromagnet injector with hydraulically guided armature intended for the injection of fuel into the suction pipe of combustion motors. Fuel pressure is preferably 1-4 bar. In addition, a manufacturing method to produce the hydraulic guidance system is described.

OBJECTIVE OF THE INVENTION AND STATE OF THE ART

U.S. Pat. No. 4708117 describes a valve with a semispherical armature. This state of the art valve is represented there as FIG. 23. The bulbous lower part of the armature seats against a circular valve seat for the unenergized valve. This state of the art valve has the problem that for a stationary armature the positioning of the armature is not sharply defined. This can result in lopsided seating of the armature with consequential variable pick-up times.

It is the objective of this invention to define a fast, low armature bounce valve, in which the armature is forced into a stable final position, and to describe a suitable method of manufacture to achieve this hydraulic parallel guidance system.

FUEL INJECTOR ACCORDING TO THIS INVENTION

Figure 1:
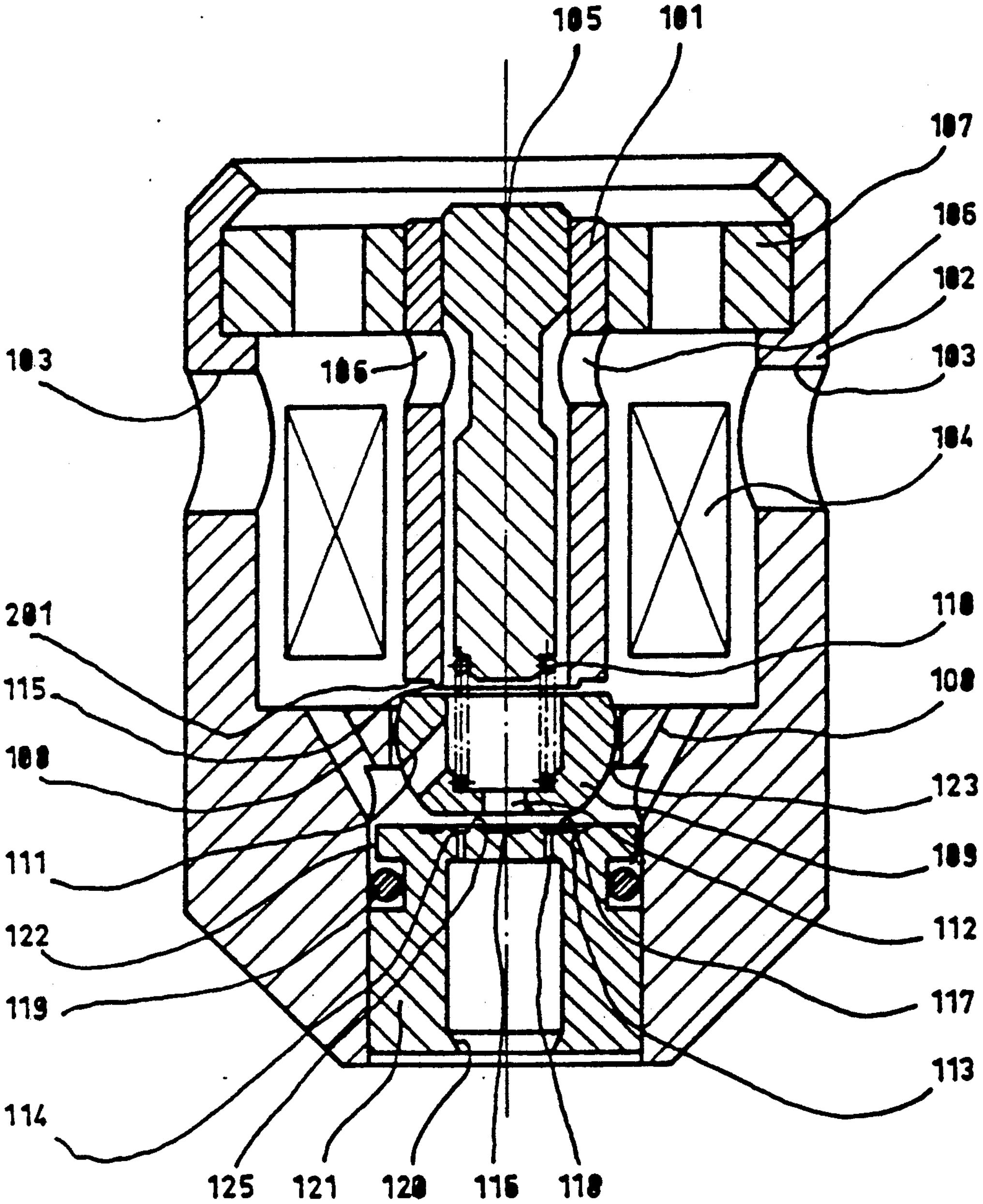
FIG. 1 is a longitudinal cross-sectional view through a fuel injector according to this invention.

A favored design of the valve is shown in FIG. 1, details of which will be described in the following:

The valve according to FIG. 1 features an armature 109 which is semi-spherical at its outer periphery; the armature is preferably machined from a sphere. The external diameter of the armature is preferably 5-6 mm. Armature 109 is flat at both top and bottom. Lateral guidance of the armature is provided by opening 123 which is part of housing 102. Because of the lateral guidance, and the flat shape at top and bottom, defined armature positioning is achieved at the termination of armature movement. Reset spring 110 is located inside armature 109. Pin 105 anchors reset spring 110. Pin 105 is pressure fitted into magnetic pole 101. Magnetic pole 101 is solidly connected to housing 102 through flange 107. The magnetic field is generated by coil 104. Magnetic return flow to armature 109 is via housing 102. The valve contains a diffuser 121 which is pressed into housing 102. Two flat valve seats 113 and 125 are machined into diffuser 121. Between valve seats 113 and 125 a circular groove 114 is disposed from which fuel flows to nozzles 118. Fuel flow to the sealing edges of the valve seats is via pockets 116 and 117 which are machined into diffuser 121. A preferred number of nozzles is 4-8. The direction of ejection of the nozzles is toward the inwards tapered edges 120 of diffuser 121. Straight line nozzles of this type are advantageous from a manufacturing point of view in comparison with the slanted arrangements otherwise in use. Furthermore, such vertically oriented nozzles allow for a specially narrow groove 114. By narrowing groove 114, the hydrostatic opening force exerted on armature 109 is reduced in advantageous manner.

Fuel delivery is via orifices 103 in housing 102. From the housing the fuel flows via side orifices 106 to the internal region of pole 101, and from there via central passage 112 in armature 109 to the inside of valve seat 113. In addition, fuel passes via passages 108 to the outside of valve seat 113. Armature 109 may contain the additional side passages 111, which serve to equilibrate pressure between inner valve seat 125 and outer valve seat 113.

The valve seat shown in FIG. 1 is perfused with fuel both on the inside and the outside, resulting in a large cross-sectional opening at small armature stroke. Electrical energy requirements of such valves with double-sided valve seats are therefore distinctly lower than those of state of the art valves. The disadvantage versus state of the art valves is to be found in reduced tightness. This loss in tightness is caused by the fact that for seats of this type pocketing of the outer sealing edge is a possibility. Such pocketing of the outer sealing edge is caused by lopsided seating of the armature.

This one-sided pocketing of the valve seat could theoretically be avoided by exact mechanical parallel guidance of the armature. Such a guidance system, however, is prohibitive because of very high manufacturing costs. A satisfactory remedy against pocketing can be arrived at by broadening outer sealing edge 113 of the valve seat up to 0.3 mm. This results in hydraulic dampening of armature impact through a damping flow inside the sealing gap. However, with such a broad outer sealing edge, the hydrostatic opening force of the valve increases in undesirable fashion.

A similar problem exists with respect to armature impact on the magnetic pole. In this case, theoretically, the desired damping of the impact movement could be obtained by assuring that both armature and magnetic pole are absolutely flat at the mutual contact surfaces. This reliably results in the desired damping of the impact movement. The certain result is also that hydraulic sticking will occur, since the fuel cannot fill the gap fast enough on the return movement. Due to such hydraulic sticking, long drop-off times and poorly reproducible return movements occur. Therefore, pole 101 in FIG. 1 features collar 115 which juts out and provides the location against which armature 109 seals. This reduces the sealing surface of the armature. The use of such collars has already previously been proposed by applicant in an earlier German application (P 34 08 012). In addition, applicant proposed there that the height of such a collar be so minimal that damping of armature impact be obtained by a hydraulic damping flow in the circular groove which surrounds the collar. However, it has become obvious in the meantime that with the manufacturing procedures available at the time, the required minimal height of the collar could not be achieved with the necessary precision and tolerable manufacturing costs. Thus, it has become common practice to date, to choose the collar height at about 0.03–0.06 mm in such dimensions that no significant damping is achieved any more in the surrounding annular gap. The collar must then be made relatively wide, at 0.3–0.5 mm, to obtain adequate damping of armature impact on the unhardened pole. Impact damping occurs then only in the contact region of collar 115 with armature 109. In addition, peak magnetic flux values are generated at the edges of the collar, which result in a slower decay of the magnetic field a the beginning of reset. At the beginning of pick-up, magnetic force is diminished through the collar in undesirable fashion.

Applicant's investigations have established that by means of narrowly toleranced damping gaps a parallel hydraulic guidance system for the armature can be achieved. To achieve such parallel hydraulic guidance narrow damping gaps are stamped or engraved into the material in the valve seat and magnetic pole region. Such parallel hydraulic guidance is effective over about 5–20% of armature stroke height. Through hydraulically parallel guidance, the armature is forced into a parallel position to the respective contact surface just before reaching the respective final position by strongly increasing hydraulic forces. These strong hydraulic forces are caused by high armature speed towards the end of the gap closing event. Hydraulic forces at the beginning of the gap opening event, in contrast, are very small, since the armature has only very low speed. In addition, the influence of fuel viscosity changes on the stability of opening- and closing-times of the valve is only very minor, since the process of hydraulic parallel guidance is only effective on a small part of the armature stroke. Hydraulic parallel guidance of the armature allows for a decrease in the effective permanent air gap and the use of narrower seat-widths, resulting overall in improved dynamic behavior of the valve.

The fashioning of the damping gaps will be explained in detail for the example of a valve according to this invention. In the valve according to the invention, hydraulic parallel guidance is achieved by stamping the magnetic pole and the valve seat with respectively circular damping gaps 201 and 117. The depth of the two damping gap is held to be as small as possible, lowest possible depth being determined by unacceptable pick-up and drop-off times. Unacceptably increasing pick-up and drop-off times, in the case of too shallow depths of the damping gaps, are caused by the fact that the fuel cannot fill up the respective damping gaps at a sufficiently fast rate at the beginning of the respective opening event. In addition, it is an absolute necessity that the depth of the damping gaps be as uniform as possible over their complete length. Otherwise hydraulic forces cause a lopsided armature position, which results in one-sided impacting of the armature. Such one-sided impacting of the armature results in high wear.

The damping gaps according to the instant invention provide an additional advantage in the valve seat region, where a growing hydraulic reset force is established during the beginning of armature stroke. This increasing hydraulic reset force is generated by flow-forces in the damping gap. These flow-forces are initially only very small during valve opening, since at first the pressure drop almost exclusively happens in the valve seat. With progressing opening of the valve, the pressure drop in the damping gap surrounding the valve seat increases, causing the rise in hydraulic reset force. In addition, these hydraulic flow forces counteract any canting of the armature, resulting in an additional stabilizing effect on armature movement.

To be sure, these flow forces decrease again towards the end of armature movement, undesirable as this may be. This decrease is explained by the fact that towards the end of armature stroke damping of the flow in the nozzles exceeds the damping effect in the valve seats. This lowers the flow rate in the seats. The dynamic characteristics of the valve are, however, affected only to a minor degree, since the region with decreasing flow-forces is passed through with high armature speed and in a very short time.

It is a matter of course, that such damping gaps can be applied not only for groove type valve seats. For instance, it is quite possible to design such a damping gap also for one of the conventional circular valve seats. To this effect, the circular valve seat is simply surrounded by a damping gap. The use of such a simple circular valve seat is also possible for the valve described in FIG. 1, alternative to the groove-type valve seat described for it.

The most favorable dimensions of damping gaps can be calculated numerically with the aid of simulation programs developed by the applicant. Nevertheless, a practically based optimization of the dimensions should be done, also in order to better assess the influence of the always present manufacturing tolerances. Experimental optimization can be done within the scope of the usual long term endurance test. Regarding the damping gap in the pole region, the gap depth should be minimized as much as possible, without provoking significant delays in drop-off time of the armature caused by hydraulic damping forces. Valve drop-off times are easily measured by known methods. The width of collar 115 is also chosen to be as small as possible, without provoking pocketing of the closing surfaces during long term endurance tests. The beginning of pocketing is easily detected with the aid of a microscope. In general, a functionally most favored height of the collar will be about 3–10 micrometers, and the width of the collar will be about 0.1–0.2 mm. The depth of the damping pocket 117, and the width of the outer valve seat are optimized by an analogous approach. The width of the inner valve seat should be as small as can be reliably achieved in manufacture (preferably about 0.1 mm). The depth of damping pocket 117 can be from 5 to 30 micrometers, where the larger values become a requirement for greater lateral extension of the pocket.

To fashion the damping gaps a stamping procedure according to this invention is employed. To start with, the surfaces which are to hold damping gaps must be absolutely plane. Then a stamping tool is placed on the surface under consideration, and the damping gap is stamped in with the aid of an impact device. The damping gap is produced by a local densification of the material of which the item consists. Local densification excludes an otherwise possible uncontrolled spring-back of the material. Uncontrolled spring-back is always then a possibility if the part to be stamped is too thin-walled and is not firmly supported in the area where the stamping is to take place. Uncontrolled spring-back impairs the precision of the stamping process in an unacceptable manner. The depth of the damping gap is defined by the kinetic energy of the impact tool. The procedure is further explained with the air of FIG. 2.

Figure 2:
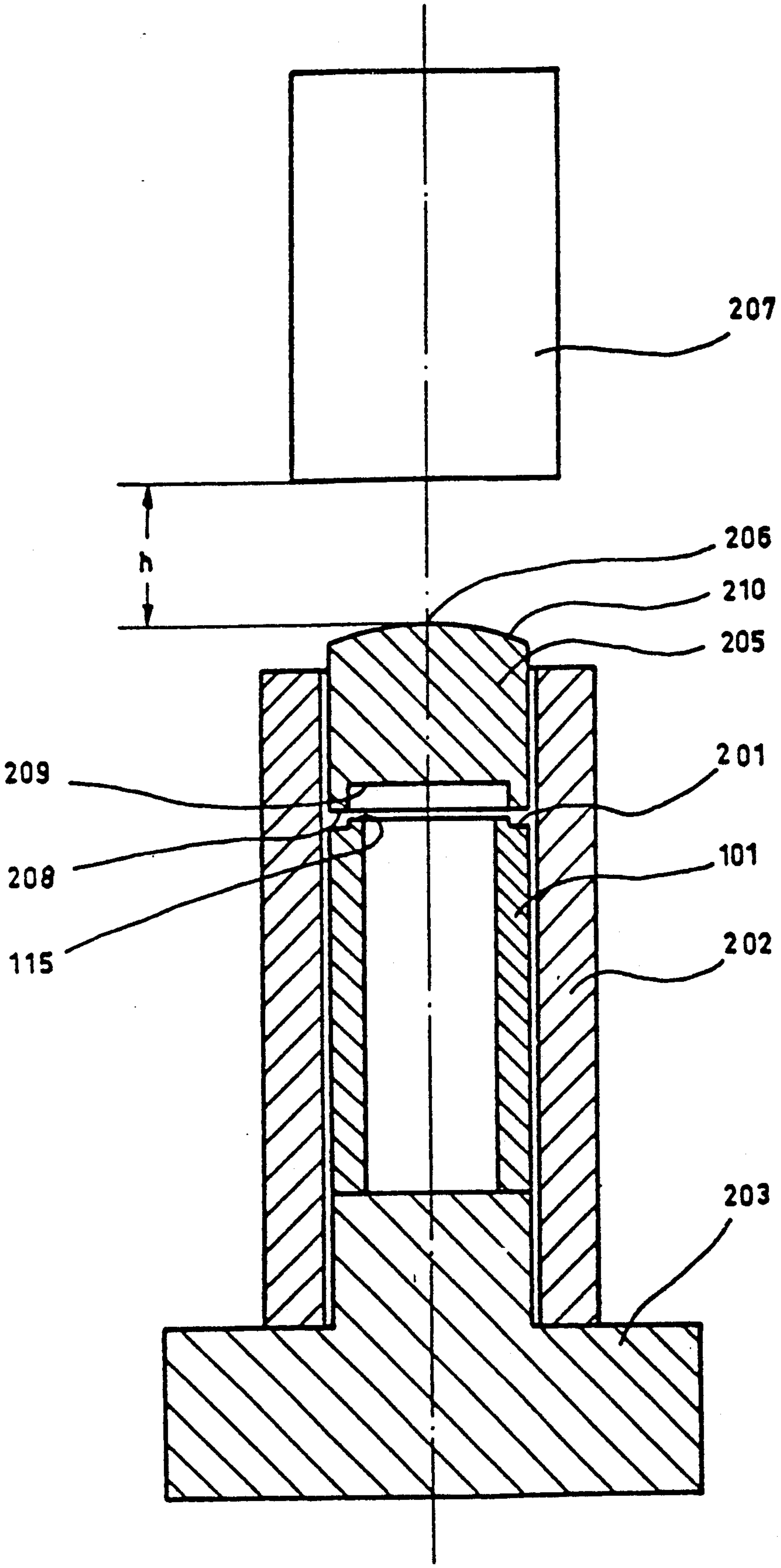
FIG. 2 is a longitudinal view through apparatus for working on one of the fuel injector's individual parts, namely a magnet pole.

FIG. 2 shows, by way of example, a suitable device to impress damping gap 201 into magnetic pole 101 of the valve according to FIG. 1. In this case magnet pole 101 is placed onto the massive pressure pad 203. The inert mass of 203 should be considerably larger than that of the work piece (pole 101). Stamping tool 205 is placed on the surface of pole 101 to be worked on. Stamping tool 205 is centered by guide sleeve 202 on pole 101. Stamping tool 205 is undercut at 209 to a larger depth than required for the damping gap. This guarantees that the stamping tool only contacts the area which is to be stamped. Lower edge 208 of the stamping tool is in the shape of the damping gap to be engraved, in this case an annular ring shape. Stamping tool 205 is spherical at its upper side. Above the stamping tool impact tool 207 is located. The depth of the stamping is given by the kinetic energy of impact tool 207, where the kinetic energy, in the case of simple impact devices, is directly proportional to the height of fall h. During the stamping process, impact tool 207 connects with contact point 206 of stamping tool 205. Given the ball-type surface 210 of stamping tool 205, contact point 206 is in the middle of the stamping device. This results in an even distribution of the impact force on surface 201 which is to be stamped. The even distribution of the impact force guarantees in simple fashion an extremely high precision of impact depth on the total circumference of the damping gap.

Alternative to the shape of stamping tool 205 shown in FIG. 2, it can also be machined out of a hardened sphere. Using such spheres simplifies the manufacture of suitable stamping tools for rotationally symmetrical damping gap shapes.

However, the procedure is not restricted to the fashioning of rotationally symmetrical damping gap shapes. To prepare arbitrary shapes of damping gaps, the general requirement is that the pressure point of the stamping tool must coincide with the area center of gravity of the damping gap. The pressure point, in this context, is defined as the point where the vertical axis of the stamping tool and the impact tool passes through the plane in which the damping gap is located (impact point of the kinetic force). For rotationally symmetrical shapes the area center of gravity is always found in the center of the damping gap. Such a simple form of an annular damping gap is exemplified in FIG. 3. However, it is readily possible to complete several coplanar damping gaps on the same work piece in one step. The pressure point in this case would be chosen as the common area center of gravity of the damping gaps which are to be completed. The workpiece may, for instance, also be of oblong flat shape. Applicant introduces in a separate simultaneous application a valve with tilt-armature, where the tilt-armature, and the bearing for same, are of such oblong flat shapes. The stamping procedure introduced here is especially well suited for complicated parts of this type.

Figure 3:
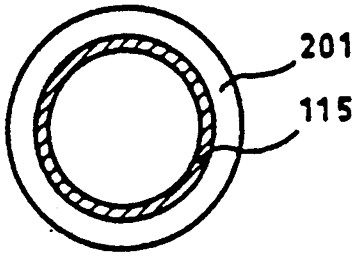
FIG. 3 is a top plan view of the magnet pole from FIG. 2.

A top-view of magnet pole 101, which has been stamped with a damping gap by the stamping tool described in FIG. 2, is shown in FIG. 3. The surface against which armature 109 seats, located on collar 115, has been cross-hatched. Collar 115 is surrounded by the stamped surface 201.

In addition, the stamping procedure according to the invention is exceptionally well suited for the manufacture of flat valve seats with narrow tolerances. In this case, the seating edge next to the damping gap is prepared directly by the stamping process for the damping gap. This will be further detailed with the aid of FIG. 4.

Figure 4:
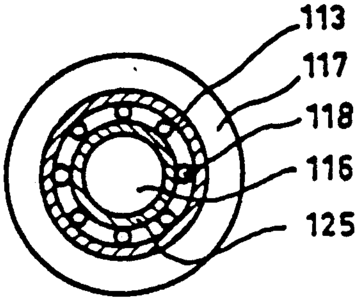
FIG. 4 is a top plan view of the fuel injector's valve seat shown by itself.

FIG. 4 shows the valve seat according to FIG. 1 in top-view. The same reference numbers as in FIG. 1 are employed. The valve seat is supported by a pressure pad which fits into the central opening of diffuser 121 and engraves inner pocket 116. Then, the complete diffuser 121 is supported by a flat pressure pad, and the outer pocket 117 is stamped in. Outer pocket 117, which forms the damping gap for hydraulically parallel guidance of the armature, should have a width of about 1–2 mm. Circular groove 114 is made by a separate working step. Alternatively, it is also possible to use a separate piece, which is flat at the bottom, and supports the valve seats. Such a piece could then be mounted on a separate diffuser. This makes it possible to support the complete seating region over a large area with one pressure pad. Both pockets, 116 and 117, are then engraved together in one step. The stamping tool is then provided with an annular groove, in this fashion the inner and outer edges of this groove engrave the inner edge of valve seat 125 and the outer edge of outer valve seat 113. Stamping depth is preferably 5–30 micrometers. The stamping step may be followed by a brief lapping procedure to insure flatness; this should remove any possible distortions of the valve seats by the stamping step.

Figure 5:
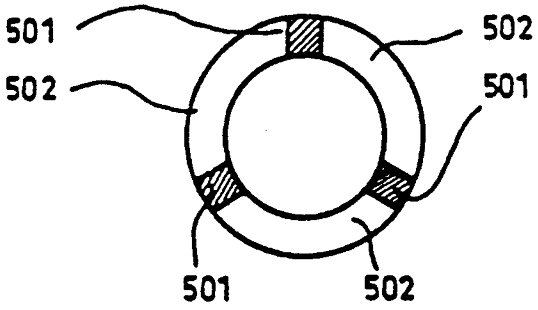
FIG. 5 is a view like FIG. 3 but of an alternate embodiment.

An especially advantageous shape for parallel guidance by damping gaps is shown in FIG. 5. In this case, the magnetic pole preferably has three contact surfaces 501, which are arranged equidistant on the circumference of the pole. Round or square contact surfaces are especially advantageous. The individual contact area segments should in each case be about 0.5–1 $mm^2$. Damping gaps 502 are stamped in between contact areas 501. Contact areas 501 are shown cross-hatched.

The damping gap design shown in FIG. 5 is also suited for the manufacture of valve needle stops in state of the art injectors. Such state of the art valves feature a valve needle, guided in a central opening, which is solidly joined to the armature. The valve needle has an annular stop surface which closes against a disc-like stop for the open valve. In line with the present invention, damping gaps will be engraved into the disc-like stop. By the additional damping of the impact movement, armature bounce is reduced, and a decrease in contact surfaces is made possible. Reduced contact surfaces result in improved stability of drop-off time for the valve.

Figure 6:
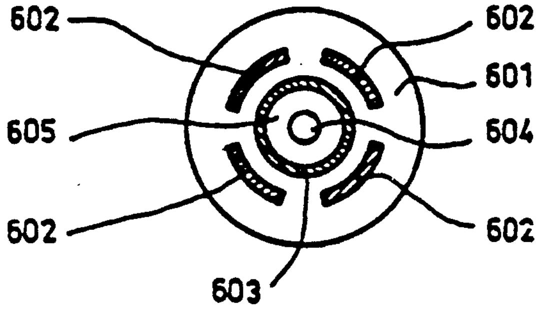
FIG. 6 is a view like FIG. 4 but of an alternate embodiment.

It is possible to avoid the effect of decreasing flow-forces towards the end of the valve opening event; to this effect several individual damping gaps are provided at the outer periphery of the valve seat. This allows fuel to flow largely unimpeded through installed grooves. A valve seat of this type will be detailed in connection with FIG. 6. Several damping gaps, 602, are symmetrically arranged around seat 603. Centered in seat 603 is nozzle 604. The surface area 601 is reset by about 0.1–0.2 mm with respect to damping gaps 602. This allows for largely unimpeded fuel flow to seat 603. Joint preparation of surface area 601 and the inside area 605 of valve seat 603 is preferably done by stamping. A lapping step of the total valve seat part, to insure planeness, follows. Then damping gaps 603 are produced by a stamping tool which covers their area, and they are further stamped to a depth of about 3–10 micrometers with respect to the seat.

Figure 7:
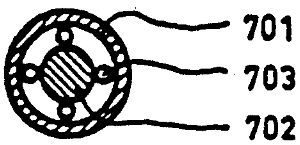
FIG. 7 is a view like FIG. 6 but of a second alternate embodiment.

A further favorable valve seat design is shown in FIG. 7. In this case, a damping gap 702 is arranged inside seat 701, the gap serves to attenuate armature impact. Around damping gap 702, several nozzles 703 are disposed. A further advantage of this seat design is an especially low fuel retention within the seat.

Additional suitable designs and variants of the valve according to the invention can be deduced from the claims.

I claim:

1. An electromagnetic fuel injector comprising a fuel inlet, a fuel outlet, an electromagnetic coil, an armature, and a reset spring arranged to control the passage of fuel from said inlet to said outlet, wherein said armature is radially guided mechanically and has a ball-type periphery and closes the injector by impacting a valve seat disposed centrally of the coil, characterized by the face that the injector is provided with two annular concentric raised valve seats forming a groove-type fuel collection space therebetween which is in communication with several nozzles leading to the fuel outlet.

2. An electromagnetic fuel injector according to claim 1 characterized by the fact that a diffuser is located below the valve seat and has an edge slanted to the inside.

3. An electromagnetic fuel injector according to claim 2 characterized by the fact that said slanted edge is located in alignment with said nozzles.

* * * * *